United States Patent [19]

Macalindin

[11] Patent Number: 4,760,295
[45] Date of Patent: Jul. 26, 1988

[54] VIBRATION-SENSITIVE TRANSDUCER

[75] Inventor: Ian Macalindin, Nr. Derby, England

[73] Assignee: Geoquip Security Systems Ltd., Melbourne, England

[21] Appl. No.: 852,344

[22] Filed: Apr. 15, 1986

[30] Foreign Application Priority Data

Apr. 17, 1985 [GB] United Kingdom .................. 8509815
Dec. 17, 1985 [GB] United Kingdom .................. 8531050

[51] Int. Cl.[4] ........................................... H02K 33/00
[52] U.S. Cl. ........................................ 310/27; 73/661; 340/550; 340/566; 367/177
[58] Field of Search .................. 310/15, 27, 25, 713, 310/26, 12; 336/110; 322/3; 367/177, 182, 187, 119; 340/566, 550; 335/303; 73/661; 324/207, 239; 318/118

[56] References Cited

U.S. PATENT DOCUMENTS

| | | | |
|---|---|---|---|
| 2,304,738 | 12/1942 | McCarty | 367/182 |
| 2,807,793 | 9/1957 | Bayhi | 367/177 X |
| 3,353,040 | 11/1967 | Abbott | 310/27 |
| 3,375,490 | 3/1968 | Stubblefield | 367/156 |
| 3,475,751 | 10/1969 | Sontag et al. | |
| 3,504,320 | 3/1970 | Engdahl et al. | 310/15 X |
| 3,579,220 | 5/1971 | Stevenson, Jr. | |
| 3,610,973 | 10/1971 | Bauer | 310/15 |
| 3,674,946 | 7/1972 | Winey | 310/25 X |
| 3,689,875 | 9/1972 | Kostalnicek | 367/177 |
| 3,836,899 | 9/1974 | Duvall et al. | |
| 4,004,268 | 1/1977 | Cook | 340/566 X |
| 4,099,168 | 7/1978 | Kedjierski et al. | |
| 4,241,338 | 12/1980 | Spirig | |
| 4,319,096 | 3/1982 | Winey | |
| 4,523,185 | 6/1985 | Roth | |

FOREIGN PATENT DOCUMENTS

| | | |
|---|---|---|
| 0005037 | 10/1979 | European Pat. Off. |
| 0012608 | 6/1980 | European Pat. Off. |
| 0013952 | 8/1980 | European Pat. Off. |
| 0016545 | 10/1980 | European Pat. Off. |
| 0029266 | 5/1981 | European Pat. Off. |
| 0035318 | 9/1981 | European Pat. Off. |
| 0036230 | 9/1981 | European Pat. Off. |
| 0043565 | 1/1982 | European Pat. Off. |
| 0057982 | 8/1982 | European Pat. Off. |
| 0066027 | 12/1982 | European Pat. Off. |
| 0093810 | 11/1983 | European Pat. Off. |
| 0119645 | 9/1984 | European Pat. Off. |
| 8400460 | 2/1984 | World Int. Prop. O. |
| 1230373 | 4/1971 | United Kingdom |
| 1278249 | 6/1972 | United Kingdom |
| 1298568 | 12/1972 | United Kingdom |
| 1319932 | 6/1973 | United Kingdom |
| 1350465 | 4/1974 | United Kingdom |
| 1380930 | 1/1975 | United Kingdom |
| 1391697 | 4/1975 | United Kingdom |
| 2020872 | 11/1979 | United Kingdom |
| 1591218 | 6/1981 | United Kingdom |
| 2103241 | 2/1983 | United Kingdom |
| 2119984 | 11/1983 | United Kingdom |
| 2123651 | 2/1984 | United Kingdom |

Primary Examiner—R. Skudy
Attorney, Agent, or Firm—Fleit, Jacobson, Cohn & Price

[57] ABSTRACT

A transducer in the form of a long cable for producing electrical signals in response to mechanical vibration of the cable. The cable comprises an elongate magnetic member and an electrical conductor extending alongside the magnetic member, the electrical conductor being loosely mounted in the magnetic field of the magnetic member so that mechanical vibration of the cable causes the electrical conductor to move relative to the magnetic field whereby an e.m.f. and hence an electrical signal is induced in the conductor. The transducer may be used in monitoring or security apparatus.

21 Claims, 3 Drawing Sheets

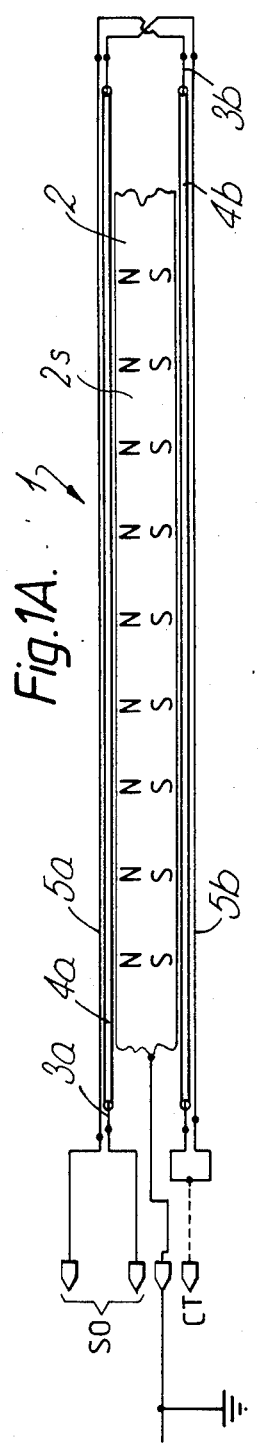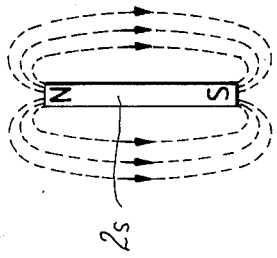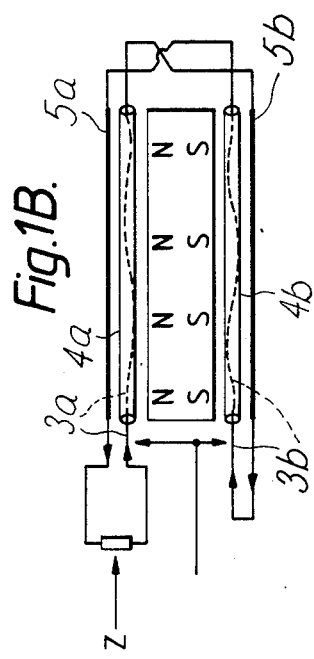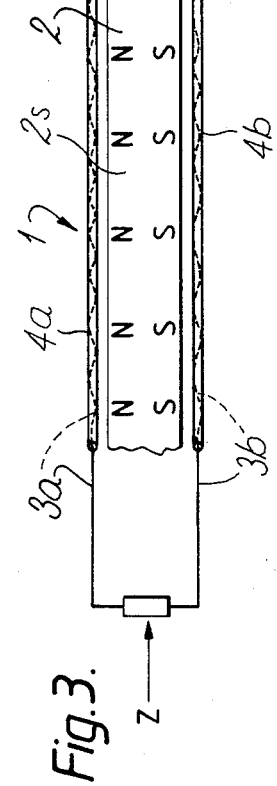

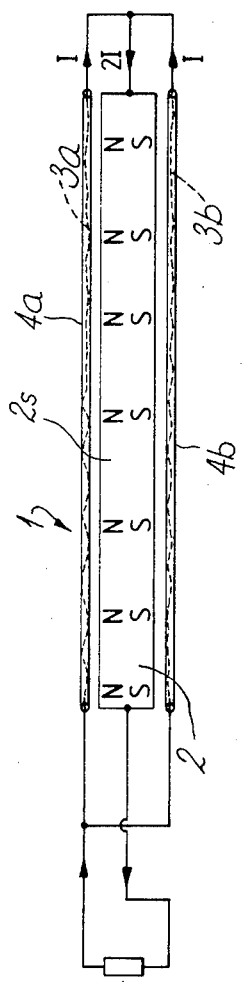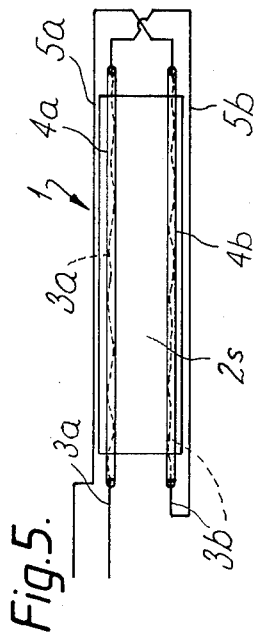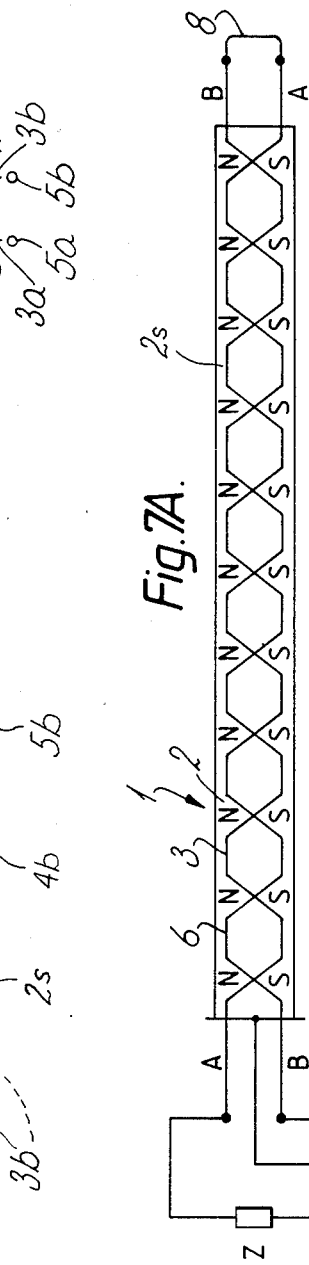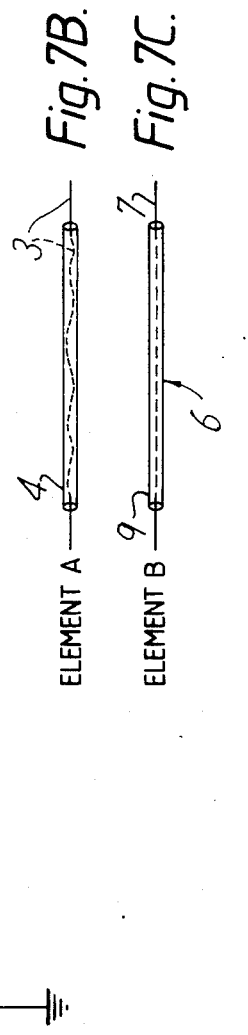

VIBRATION-SENSITIVE TRANSDUCER

The present invention relates to a linear vibration-sensitive transducer designed primarily to be attached to perimeter fences or other structures although it may well find applications in other fields not directly related to the security industry. The transducer operates by producing electrical signals in response to mechanical vibrations impinging on the outer surface of the device. When the signals thus produced are electronically processed, it is possible to determine the nature of the disturbance causing the signals, and hence give warning of impending malicious acts.

To date, most intruder alarm systems employing linear vibration sensors usually rely on either the natural microphony of a co-axial type cable, in which the signal generation mechanism is attributed to the tribo-electric effect, or a modification of this type in which the dielectric material of the cable is subjected to some form of processing which enhances the sensitivity of the cable. This latter family of devices include, among others, electret and piezo-electric type cables. These types of sensor, while producing adequate signal levels, are by no means ideally suited to the application outlined. The salient disadvantages of these sensors are detailed below.

(1) High output impedance

If, as often is the case, the analogue signals from the sensor cable have to be returned to a central monitoring point, some form of buffer circuitry must be interposed between the sensor and the interconnecting cable so that the higher frequency components of the signal are not attenuated by the cable capacitance. Of necessity, this circuitry must be physically adjacent to the sensor and may be exposed to extremes of climatic conditions thus reducing system reliability. Also, the buffer circuitry requires a power source which, in most cases, will necessitate an additional pair of conductors to be routed to the interface box. This additional cabling involves a significant increase in the installed cost and is hence undesirable. High source impedances also pre-empt the realisation of a truly low-noise, high-gain system, since a pre-requisite of a low-noise system is a low source impedance.

(2) Variations in sensor sensitivity

In the case of processed dielectric cables, which account for the largest percentage of this type of system, the degree of sensitivity is related to the level of electrical stress which can be applied to the dielectric during the sensitisation process. Since it is impossible to guarantee 100% uniformity of cable dimensions during manufacture, it follows that the maximum stress which can be applied to the cable must be modified to prevent breakdown at the weakest point in the cable. This means that all other points along the length of the cable will be less sensitive than the weakest section(s) as well as exhibiting variations of sensitivity at other manufacturing discontinuities.

High cost per meter

Most of the sensors in use at the present time utilise a PTFE dielectric material which in itself is an expensive material; however a major problem in producing long lengths of PTFE cable is that it is difficult to obtain large batches of raw PTFE of sufficiently uniform characteristics to ensure close tolerances during manufacture. For this reason the cost of lengths significantly in excess of 100 meters tends to be considerably more expensive pro rata than lengths of 1000 meters or less.

These aforementioned points highlight the major disadvantages of the co-axial type of sensor.

The transducer described in the following text operates on an entirely different principle to those sensors outlined earlier. Whereas the co-axial types of sensor involve the movement of conductors in an electric field, this sensor relies on the movement of conductors in a magnetic field. As is well known, the mechanical movement of a conductor in a magnetic field will result in the generation of an EMF across the ends of the conductor. In the transducer described, a conductor is arranged in such a way as to allow it to vibrate within a magnetic field in response to externally generated mechanical vibrations impinging on the outer sheath of the transducer. Since it is now possible to obtain flexible magnetic materials, it is possible to construct a vibration sensor in the form of a transducer based on this principle and offering the advantages of the earlier types of cable sensors.

According to the present invention there is provided a cable type transducer for producing electrical signals in response to a mechanical vibration or impulse comprising an elongate structure comprising magnetic flux generating means and an electrical conductor movable, in response to mechanical disturbance of the cable, in the magnetic field generated by the flux generating means thereby to produce said signals.

Preferably, the flux generating means comprises an elongate portion of flexible magnetised material. This can be in the form of a tape with the electrical conductor or conductors, for example, along one edge (where there is one) or two electrical conductors (where there are two), for example one on either edge.

The conductors may be made of very fine wire loosely fitting into a small bore tube attached to, or integral with, the flux generating means.

To reduce the sensitivity of the transducer to external magnetic fields, the conductor or conductors may be arranged so as to be non-inductive with respect to an external applied field; this may for example be achieved by wiring them in a circuit with additional conductors which are fixed so as not to vibrate in the magnetic field and thereby not to have EMFs induced in them. Furthermore, they may be arranged so as to produce a balanced output relative to a 'centre tap'; the centre tap may be provided by one or more of the fixed conductors just mentioned, or, if the magnetised core is conductive, by the core.

Wiring configurations which achieve the above functions will be described below.

In an alternative arrangement, a wire loosely fitting within its sleeve may be arranged along the core in a "twisted pair" configuration with a conductor which is not movable relative to the core, e.g. a conventional insulated wire fixed to the core. The use of a twisted pair gives high inherent noise immunity, while having one wire fixed avoids signal cancellation as compared with having two loosely mounted wires. These features (the twisted pair arrangement and the use of a fixed conductor) may be used independently of one another.

In an alternative embodiment the transducer may be in the form of a cable comprising a generally circular cross-section magnetized core having slots in its surface which house the electrical conductors. The core may be formed in one piece or from two or more complementary similarly-shaped parts, e.g. two parts having generally semi-circular cross-section and having recesses in its surface which, when the two halves are assembled, define the longitudinally extending slots for the conductors.

In order to allow the active conductors to move with respect to the magnetic field generated by the core in response to a vibration of the cable while holding the return conductors stationary with respect to the magnetic field, the slots for the return conductors may be of the same size or preferably slightly smaller than the diameter of the conductors, while the slots for the active conductors are larger than the diameter of the conductors.

The assembly of core and conductors is preferably sheathed with an outer jacket material which serves to protect the cable and which may also serve to prevent the active conductors being displaced from their slots. An electrostatic shield of foil tape may be wound around the core and conductors before sheathing with the outer jacket.

In order to prevent ingress of the jacket material into the slots an extruded plastics section may be pressed into the slots before the jacket is added.

The construction of the cable in an overall circular cross-section has the advantages as compared with a tape that various standard accessories and components (e.g. grommets and glands) can be used with it, that manufacture is more straightforward and that a more intense field, within which the conductor(s) move can, be generated.

The invention further provides a monitoring apparatus, for security- or hazard- or other state-monitoring purposes which, in use, is coupled to the transducer and includes the circuitry responsive to an EMF induced in the transducer to produce an electrical signal indicative of said state; the transducer may be one per se embodying the invention.

The invention will be further described by way of non-limited example with reference to the accompanying drawings in which:

FIG. 1A is an elevational view of one embodiment of a transducer according to the present invention;

FIG. 1B shows, to a large scale, a schematic detail of the transducer of FIG. 1A;

FIG. 2 illustrates the pattern of magnetic flux in the transducer core;

FIGS. 3, 4 and 5 show further embodiments of a transducer according to the present invention;

FIG. 6 illustrates schematically the cross-section of the embodiment of FIG. 5;

FIG. 7A is a view, corresponding to FIG. 1A, of a further embodiment of the invention;

FIGS. 7B and 7C are details of the conductors of the transducer of FIG. A.

Figure 8A:
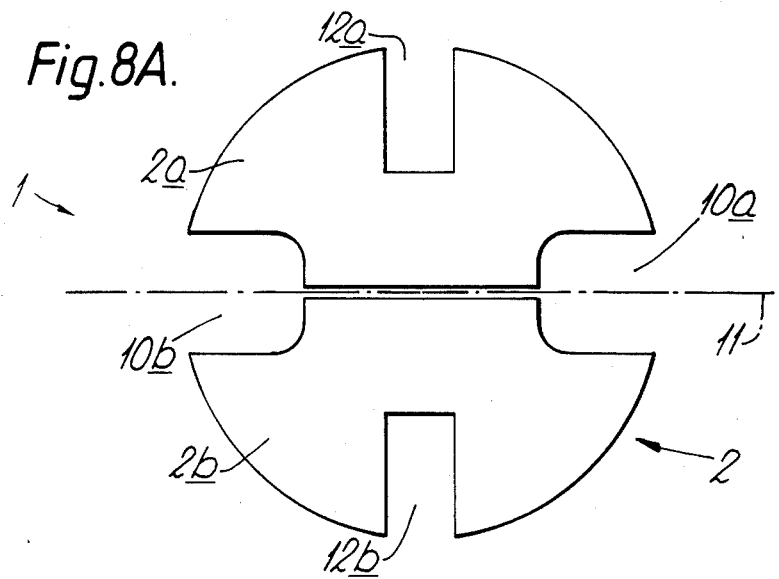
FIG. 8A shows the core construction of another embodiment of the present invention.

FIGS. 1A and 1B show the general arrangement of conductors of a cable-type transducer in a first embodiment of the invention and their physical placement in relation to a core 2 of magnetic material. The magnetic core 2, which is a flux generating mechanism and the central component of the transducer 1, comprises an elongate portion in the form of a flexible strip or tape 2s of magnetised metallic material which is permanently magnetised by subjecting it to a powerful external magnetic field; alternatively, the core 2 could be made of a plastics material, preferably electrically conductive as it is advantageous for the core to be connected to the system earth of the monitor to which the transducer 1 is connected. The direction of polarisation of the field is at right-angles to the length of the strip 2s and the sense of the field is the same throughout the length of the strip. In order that the final assembly be flexible enough, the strip 2s is suitably only of the order of 0.05 mm thick, while the strip width is in the region of 6 mm. FIG. 2 shows the distribution of the magnetic flux as would be seen looking on the end of a section of the strip 2s.

Along each edge of the core 2 is a respective active conductor wire 3a, 3b which is loosely fitted in a respective small bore tube or sheath 4a, 4b secured to, or integral with, the core 2. The conductors 3a, 3b are thus adjacent to the respective poles of the core 2. Any vibration transmitted through the sheaths 4a, 4b of the transducer 1 will cause the conductors 3a, 3b to vibrate in sympathy and in doing so will induce an E.M.F. in the conductors as a result of their movement within the magnetic field.

In FIG. 1A, the signal output so is taken from the left-hand ends of conductors 3a and 5a and is balanced with respect to a centre tap CT provided by the connection between the left-hand ends of conductors 3b and 5b. It will be seen that at the remote, righthand end, the conductors 3a, 3b, 5a and 5b, cross over, conductor 5a being connected to conductor 3b and conductor 5b to conductor 3a. All the conductors 3a, 3b, 5a and 5b; may be enamel coated or otherwise insulated. FIG. 1B is intended to facilitate an appreciation of the operation of the embodiment of FIG. 1A and shows the input impedance Z of the monitoring circuit.

The monitoring circuit can include any suitable type of analogue and digital circuitry or both for suitably monitoring the output of the transducer 1 and producing one or more signal outputs indicative of the state which it is desired to monitor. The circuitry may include signal processing circuitry for monitoring one or more characteristics of the transducer output, e.g. spectral content, amplitude or duration, which depends on the vibration or movement which it is desired to detect.

The overall arrangement of the conductors 3a, 3b, 5a and 5b shown in FIG. 1A is chosen to maximise the signal level caused by mechanical vibration while minimising the signals induced by external electro-magnetic fields. This is achieved by arranging the loop formed by the conductors 3a, 3b, 5a and 5b to be non-inductive as far as external electro-magnetic fields are concerned. To this end, return conductors 5a, 5b (i.e.—not the vibrating active conductors 3a, 3b) secured relative to the core 2 via extruded outer sheathing material (not shown) run along a path which follows the active conductors as closely as possible so that the overall conductor assembly appears to be a bifilar-wound loop, i.e. two loops of opposite senses, which will tend to cancel the effect of externally induced magnetic fields. The ultimate realisation of this goal can be achieved by utilising a twisted pair of conductors adjacent to each pole of the magnetic material strip 2s. Normally this would mean that the desired signal resulting from the vibrations received would also be minimised except that one conductor of the pair is fixed in relation to the magnetic field. This is achieved by using a much thicker conductor which is 'locked' in position by the outer abovementioned sheathing material (not shown). The net result therefore, is that mechanical vibrations impinging on the transducer 1 will induce E.M.F.s in the conductors 3a, 3b which are free to move in the magnetic field, thus causing a current to flow in the loop formed by the conductors and a terminating impedance. Moving magnetic fields caused by external electrical disturbances however, will tend to cause currents to flow in the loop elements which cancel out as far as the resultant signal appearing across the terminating impedance is concerned. Signals resulting from mechanical vibrations are enhanced by arranging the connection of the two 'active' conductors so that the E.M.F.s induced by the vibrations are additive. Considering an impact occurring at one particular point on the transducer 1, it is reasonable to assume that both 'active' conductors 3a, 3b will experience an acceleration in the same direction due to the impact. Since the direction of polarisation of the magnetic field is the same for both conductors, 3a, 3b the direction of induced current flow in each conductor will also be the same. If the two conductors 3a, 3b were now connected at the same end of the transducer 1, the currents induced in the loop now formed with the terminating impedance would tend to cancel, thereby reducing the sensitivity of the transducer 1. FIG. 3 shows this less advantageous arrangement where there are just two sheathed conductors 3a and 3b attached to opposite sides of a magnetized metallic strip 2s of a core 2.

If however, the conductors 3a, 3b, 5a and 5b are arranged as shown in FIGS. 1A and 1B, it can be seen that currents induced in the same direction in each 'active' conductor 3a, 3b will be additive, thereby improving the overall sensitivity of the transducer 1. In practice it has been found that reasonable signal levels are achieved using the arrangement shown in FIG. 3. This can be attributed to the fact that, due to mechanical limitations, both active conductors 3a, 3b will never move exactly in sympathy with each other, so a resultant current will always be generated. Further improvement in rejection of unwanted interfering signals can be realised by earthing the metallic magnetic strip 2s, thus providing a degree of electrostatic shielding adjacent to the conductors 3a, 3b, 5a and 5b.

FIG. 4 illustrates a variation on the arrangement shown in FIG. 3. In this case, a metallic magnetic strip 2s is used as the return conductor instead of having separate conductors such as 5a and 5b in FIGS. 1A and 1B so that the currents induced in the active conductors 3a and 3b are now in-phase, thus increasing the sensitivity of the transducer 1. This arrangement however, in common with that of FIG. 3, may be prone to externally induced electro-magnetic interference.

FIGS. 5 and 6 show a variation on the arrangement of FIGS. 1A and 1B. In this case, active conductor/tube assemblies including active conductors 3a, 3b, and tubes 4a, 4b, are mounted on the face of a magnetic strip 2s adjacent to the edges. When the extrusion process is complete and the conductors 3a, 3b, 5a and 5b, and magnetic strip 2s are "locked" in place relative to each other, it is possible to "fold" the resultant assembly in half as shown in FIG. 6, to form a folded transducer 1. If, as shown, the "active" conductors 3a,3b are "sandwiched" together between the folded magnetic strip 2s, they are now subject to a more intense magnetic field as a result of the reduction in the air-gap between the poles of the magnet. The magnetic strip 2s now appears to be similar to the familiar "horseshoe" type of magnet. The operation of folding the sensor transducer in half is simple to implement during the installation of such a transducer on say, a perimeter fence since the transducer is normally fixed in place with plastic ties which could also serve to maintain the transducer in the "folded" condition. Depending on the wall thickness of the sheaths or tubes 4a, 4b in which the active conductors 3a, 3b are received, and the finished rigidity of the assembly, it may be necessary to use a slightly wider magnet strip 2s in order to be able to completely fold the assembly into a "U" shape. The fold could, of course, be imparted during manufacture, if desired.

FIGS. 7A to 7C show a transducer 1 in accordance with a further embodiment of the invention. Here, the conductors 3a, 3b have been replaced by an element A comprising a conductor 3, again loosely fitting within a sheath 4 and movable relative to a magnetic core 2. The conductor 3 is arranged in a "twisted pair" with, and connected at a remote end of the core 2 by a conductor link 8, to an element B comprising a conductor 6 which is a conventional wire with a conducting core 7 and a close-fitting sheath 9, so that the conducting core 7 is unable to move relative to the magnetic core 2 to the same degree as is the conductor 3.

The twisted pair of conductors 3 and 6 are held in place, in contact with a magnetized surface of the metallic strip 2s by an outer jacket (not shown) of the resultant cable.

The use of the conductors 3 and 6 in a twisted pair configuration overcomes the first problem of induced interference as it has inherent immunity to external electromagnetic interference. The use of the conductor 6 is to overcome the problem of signal cancellation, since it will not vibrate within the magnetic field of the core 2 and will therefore prevent signal cancellation occurring. In order to maintain a balanced system, both conductors 3 and 6 in this arrangement will be identical in respect of factors determining resistance material, cross-sectional area, construction, temperature coefficient etc.

Figure 8B:
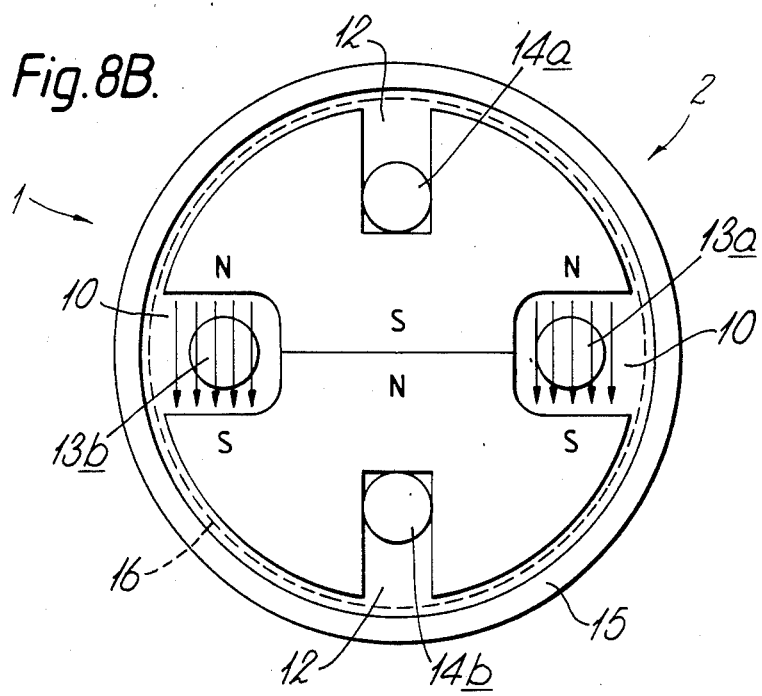
FIG. 8B is a cross-sectional view of the embodiment of FIG. 8A.

FIGS. 8A and 8B show another embodiment of the invention where a transducer 1 is in the form of a circular cable rather than a tape. As shown in FIG. 8a a core 2 is constructed from two identically shaped parts 2a and 2b of magnetic material. Each part 2a and 2b is generally of semi-circular cross-section and has formed in its surface a rectangular recess 12a or 12b which defines a longitudinally extending slot and two longitudinally extending, oppositely disposed radiused rebates 10a and 10b. When assembled as shown the two parts 2a and 2b form the core 2 having two pairs of longitudinally extending rectangular slots 10 and 12 (FIG. 8B) symmetrically disposed about a plane 11.

The radiused rebates 10a and 10b are of such a size that the pair of rectangular slots 10 they define in the assembled core 2 is wider than the pair of rectangular slots 12.

The two parts 2a and 2b of the core 2 are magnetized to give the pole configurations shown in FIG. 8B and designated by "N" and "S". Such a pole configuration has the advantage that the two parts 2a and 2b of the core 2 tend to attract each other which assists manufacture.

The transducer 1 is constructed as shown in FIG. 8B. A plurality of conductors 13a, 13b, 14a and 14b are all the same with return conductors 14a, 14b in slots 12 and active conductors 13a, 13b in slots 10.

The conductors 13a, 13b, 14a and 14b have such a diameter that the return conductors 14a, 14b are held firmly in fixed position in the slots 12, but the active conductors 13a, 13b are free to move in slots 10 in response to mechanical vibration of the cable and thereby generate electrical signals.

The core 2 and conductors 13a, 13b, 14a and 14b are sheathed in an outer jacket 15 which is of plastics material extruded onto the cable. The outer jacket 15 serves the dual function of protecting the cable and preventing the active conductors 13a, 13b from coming out of the slots 10.

A layer of foil tape 16 may be wound around the core 2 and conductors 13a, 13b, 14a and 14b before the outer jacket 15 is put on. This provides an electrostatic screen and also prevents ingress of the jacket material into the slots 10 and 12. An alternative way of preventing this ingress is to press an extruded plastics section into the slots 10 and 12 before putting on the jacket 15.

The conductors 13a, 13b, 14a and 14b may be connected in the similar configurations to those described in connection with the first embodiment to provide a non-inductive loop and a balanced or differential output.

An alternative way of allowing the active conductors 13a and 13b to move while holding the return conductors 14a and 14b still is to make all the longitudinally extending slots 10 and 12 equal width and use return conductors of a larger diameter than the active conductors.

The major advantages of the illustrated sensor transducer constructions include:

(1) Low output impedance

Since the signal produced is developed across a copper conductor or other good conductor, the output impedance is very low. This enables the signal to be transmitted along much longer lines without degradation than is possible with the co-axial type of sensors. Also, a much higher signal to noise ratio can be realised for the reasons outlined above.

(2) Uniform signal response

It is comparatively easy to ensure that the magnetic material is subjected to exactly the same magnetising force along the length of the magnetic strip. Consequently the signals induced will be less likely to vary in amplitude for a given force than is the case with the co-axial sensors. Also, since the magnetic strip can be metallic in nature, it is fairly simple to ensure its dimensional accuracy during manufacture. This should result in a more uniform sensor construction than has been possible previously. Another feature of this type of sensor is that since the magnetic effect is, to all intents and purposes, permanent, there should be no loss of sensitivity due to aging of the cable. This contrasts with the electret-type of cables which show inherent charge decays over a period of time resulting in loss of sensitivity.

(3) Balanced output available (in FIGS. 1 and 4)

Since a 'centre-tap' of the transducer is available at each end of the assembly, it is inherently a balanced type of line which enables a high degree of common-mode rejection to be realised. This reduces the complexity of the processing circuitry necessary to otherwise achieve this.

I claim:

1. A cable type transducer in the form of an elongate cable for producing electrical signals in response to a mechanical vibration or impulse of the cable at any point along the cable comprising an elongate structure comprising elongate flexible magnetic flux generating means extending continuously longitudinally of said elongate structure, an electrical conductor and support means for supporting said electrical conductor so that it extends substantially longitudinally of the elongate structure and is loosely constrained laterally of the structure within the magnetic field generated by the magnetic flux generating means to allow limited movement of the electrical conductor relative to magnetic field generated by the magnetic flux generating means so that the said electrical conductor is movable in response to mechanical disturbance of the cable at any point along the cable, relative to the magnetic field generated by the magnetic flux generating means, so that the movement induces an e.m.f. in the electrical conductor thereby producing said electrical signals.

2. A cable type transducer according to claim 1 wherein the magnetic flux generating means is formed from a permanently magnetised metallic material.

3. A cable type transducer according to claim 1 wherein the magnetic flux generating means is formed from a permanently magnetised plastics material.

4. A cable type transducer according to claim 1 wherein the magnetic flux generating means is in the form of a tape.

5. A cable type transducer according to claim 1 further comprising a sheath and a wire loosely fitting into said sheath and wherein said electrical conductor is constituted by at least one run of said wire lengthwise of the cable.

6. A cable type transducer according to claim 5, wherein the sheath is integral with the magnetic flux generating means.

7. A cable type transducer according to claim 1 wherein the electrical conductor is disposed so as to be non-inductive with respect to an externally applied electro-magnetic field.

8. A cable type transducer according to claim 7 wherein the electrical conductor comprises two runs of electrical conductor arranged in a twisted pair configuration.

9. A cable type transducer according to claim 1 further comprising a further electrical conductor extending along the structure, the first mentioned electrical conductor and the further electrical conductor being connected so as to provide a balanced output.

10. A cable type transducer for producing electrical signals in response to a mechanical vibration or impulse comprising an elongate structure comprising elongate magnetic flux generating means and an electrical conductor, the electrical conductor being loosely retained alongside the magnetic flux generating means within the magnetic field generated thereby so that the said electrical conductor is movable in response to mechanical disturbance of the cable, relative to the magnetic flux generating means, so that the movement induces an e.m.f. in the electrical conductor thereby producing said electrical signals and wherein the magnetic flux generating means constitutes an additional electrical conductor and the first mentioned electrical conductor and the magnetic flux generating means are electrically connected so as to provide a differential output.

11. A cable type transducer for producing electrical signals in response to a mechanical vibration or impulse comprising an elongate structure comprising elongate magnetic flux generating means and an electrical conductor, the electrical conductor being loosely retained alongside the magnetic flux generating means within the magnetic field generated thereby so that the said electrical conductor is movable in response to mechanical disturbance of the cable, relative to the magnetic flux generating means, so that the movement induces an e.m.f. in the electrical conductor thereby producing said electrical signals, the transducer further comprising a cylindrical core having a longitudinally extending slot defined therein, and wherein the said electrical conductor is located in the slot in the periphery of the cylindrical core.

12. A cable type transducer according to claim 11, wherein the said core constitutes the said magnetic flux generating means.

13. A cable type transducer according to claim 12, wherein the core comprises two parts which when assembled meet on a diameter of the cross-section of the core.

14. A cable type transducer, according to claim 13, wherein at least one of the said slots is wholly defined in one of the parts of the core and at least one other of the said slots is defined by both parts of the core and straddles their common diameter plane.

15. A cable type transducer according to claim 11, wherein the said electrical conductor comprises a first run of said electrical conductor and a second run of said electrical conductor and the said longitudinally extending slots comprise one or more narrow slots and one or more wide slots, the width of the said narrow slots being smaller than the diameter of the said first run of electrical conductor and the width of the said wide slots being greater than the diameter of the said second run of said electrical conductor, the first run of said electrical conductor being housed in the said one or more narrow slots and the second run of conductor being housed in the said one or more wide slots, in that the second run of conductor is free to move relative to the magnetic flux generating means in response to the vibration of the cable but the first run of said electrical conductor is held fixed relative to the magnetic flux generating means.

16. A cable type transducer in the form of an elongate cable for producing electrical signals in response to a mechanical vibration or impulse of the cable at any point along the cable comprising an elongate structure comprising elongate flexible magnetic flux generating means extending continuously longitudinally of said elongate structure and formed by a tape of permanently magnetized material parallel to its width in the same direction over its enire length, an electrical conductor and support means for supporting said electrical conductor so that it extends substantially longitudinally of the elongate structure and is loosely retained alongside the edges of the tape of magnetic flux generating means adjacent a pole of the magnetic flux generating means within the magnetic field generated thereby to allow limited movement of the electrical conductor relative to the magnetic field generated by the magnetic flux generating means so that the said electrical conductor is movable in response to mechanical disturbance of the cable, relative to the magnetic field generated to the magnetic flux generating means, so that the movement induces an e.m.f. in the electrical conductor thereby producing said electrical signals, the support means comprising a hollow sheath extending alongside said magnetic flux generating means and said electrical conductor comprising a wire loosely fitting into said sheath, said wire having an external diameter smaller than an internal diameter of said hollow sheath and wherein said electrical conductor is constituted by at least one run of said wire lengthwise of the cable.

17. A cable type transducer for producing electrical signals in response to a mechanical vibration or impulse comprising an elongate structure comprising elongate magnetic flux generating means and an electrical conductor, the electrical conductor being loosely retained within the magnetic field generated by the magnetic flux generating means so that the said electrical conductor is movable in response to mechanical disturbance of the cable, relative to the magnetic flux generating means, so that the movement induces an e.m.f. in the electrical conductor thereby producing said electrical signals, the transducer further comprising a core conforming generally to a cylindrical surface and having means defining at least one slot portion extending longitudinally of the core and radially inwardly of said cylindrical surface and in which slot portion is located said loosely retained electrical conductor.

18. A cable type transducer according to claim 17 wherein the core comprises two parts having generally semi-circular cross-sections.

19. A cable type transducer according to claim 17 wherein the core constitutes said magnetic flux generating means and comprises two parts each having a curved surface of a generally semi-circular cross-section and arranged with their curved surfaces facing outwardly from a diameter plane of the core, and wherein said at least one slot portion is defined by both parts of the core and straddles said diameter plane.

20. A cable type transducer according to claim 19 wherein the core has first and second slot portions defined therein and said electrical conductor comprises a first run having a diameter smaller than the first slot portion and being loosely retained therein so that it is free to move in response to mechanical disturbance of the cable and a second run located in the second slot portion and being restrained against movement relative thereto.

21. A cable type transducer according to claim 20 wherein said second run of electrical conductor comprises a wire having a close-fitting insulating sheath.

* * * * *